United States Patent [19]

Kia

[11] Patent Number: 4,781,876
[45] Date of Patent: Nov. 1, 1988

[54] METHOD OF PRODUCING GLASS FIBER MAT REINFORCED PLASTIC PANELS

[75] Inventor: Hamid G. Kia, Utica, Mich.
[73] Assignee: General Motors Corporation, Detroit, Mich.
[21] Appl. No.: 74,772
[22] Filed: Jul. 16, 1987
[51] Int. Cl.$^4$ .............................................. B29C 43/30
[52] U.S. Cl. .................................. 264/261; 264/259; 264/274
[58] Field of Search ............... 264/250, 255, 257, 258, 264/261, 259, 274

[56] References Cited

U.S. PATENT DOCUMENTS

| | | | |
|---|---|---|---|
| 4,245,006 | 1/1981 | Shanoski | 264/255 |
| 4,438,062 | 3/1984 | Griffith et al. | 264/255 |
| 4,477,405 | 10/1984 | Makhlouf et al. | 264/255 |
| 4,610,835 | 9/1986 | Ghavamikia | 264/255 |

FOREIGN PATENT DOCUMENTS 1457935 12/1976 United Kingdom ............... 264/255

OTHER PUBLICATIONS

Plastics World, Mar. 1978, "Class A Finish on SMC", pp. 48–51.

*Primary Examiner*—James Lowe
*Assistant Examiner*—Jeremiah F. Durkin, II
*Attorney, Agent, or Firm*—R. W. Tung

[57] ABSTRACT

A method of producing a smooth surface on a premolded glass fiber reinforced plastic panel where protruding fibers would otherwise produce a rough surface. The method is practiced by coating the surface of a premolded glass fiber reinforced plastic panel maintained at or near the molding temperature with a polyurethane composition, and applying molding pressure on the coated surface to cause the coating resin to flow and fill the valleys between the protruding fibers. The molding pressure is released while the coating resin is still in its fluid state. A finished, smooth panel is made by this process which can be readily painted and used as an automotive exterior body panel. Optionally, a layer of a predecorated sheet material can first be placed in the upper mold cavity of a mold, then compressed against a premolded panel positioned in the lower mold cavity with a layer of coating resin sandwiched in between. A finished, predecorated panel having a predecorated sheet permanently bonded to the panel is produced by this process. The finished, predecorated panel can be readily used as an automotive exterior body panel without further painting or decorating.

2 Claims, 1 Drawing Sheet

METHOD OF PRODUCING GLASS FIBER MAT REINFORCED PLASTIC PANELS

FIELD OF THE INVENTION

The present invention generally relates to the molding of glass fiber reinforced plastic panels and, more particularly, is concerned with a method of producing a smooth surface layer on the surface of a premolded glass fiber reinforced plastic panel where protruding fibers would otherwise produce a rough surface.

BACKGROUND OF THE INVENTION

Glass fiber reinforced plastics have been used widely in recent years in the automotive industry. These plastics include sheet molding compound, glass fiber reinforced reaction injection moldable materials and various other glass fiber reinforced plastics. The advantages of lightweight, high strength, rustproofing and relatively low cost make them ideal for many automotive interior and exterior body panel applications.

Of these materials, the reinforced reaction injection moldable material (RRIM) is of particular interest to the automotive industry since they can be processed economically with low cost equipment. RRIM materials filled with milled glass have greatly improved stiffness and are suitable for applications where structural integrity is required. These materials are also suitable for use in large automobile exterior body panels since they produce readily paintable surfaces. However, one inherent drawback of these RRIM materials is that they have a relatively high coefficient of thermal expansion, i.e., $33 \times 10^{-6}/°C$. in the direction parallel to flow, $108 \times 10^{-6}/°C$. in the direction perpendicular to flow, as compared to that of only $12 \times 10^{-6}/°C$. for steel. Consequently, when used in relatively large and flat panels where the service life of the part covers a wide temperature span (e.g., $-20°$ C. to $+70°$ C.), the dimensional stability of the RRIM materials is often less than desirable.

To meet the requirement of dimensional stability on a large body panel, a new type of glass fiber reinforced RIM material was subsequently developed by using a glass fiber mat of continuous glass. The presence of a glass fiber mat embedded in a large RIM part through the whole area dramatically improves its dimensional stability, while all other desirable mechanical and processing properties are maintained.

The processing of glass fiber mat reinforced RIM is relatively simple. It involves placing a glass fiber mat in a mold cavity and shooting RIM material into the closed mold so that the RIM material is soaked through the mat. A completed part is then removed after it is cured in the mold.

A typical RIM used in this process is a polyurethane based material produced from two components: an isocyanate and a polyol. The in-mold pressure normally seen in the RIM process is less than 50 psi, requiring much less clamping force than other processes.

The glass mat reinforced RIM material is especially suitable for large body panels such as door panels or quarter panels on a vehicle. The dimensional stability of a resulting door panel or quarter panel is greatly improved while the traditional characteristics of RRIM, i.e., stiffness, strength, and ease of processing are maintained. The coefficient of thermal expansion of a glass mat reinforced RIM material is only one-third ($13 \times 10^{-6}/°C$.) of that for a RRIM material filled with milled glass. As a matter of fact, its thermal stability property is even superior to that of aluminum.

In the processing of glass fiber mat reinforced RIM parts where aesthetic property is important, however, a new problem has arisen. This is the glass fiber readout problem observed in the surface layer of a glass mat reinforced RIM part. The readout problem is caused largely by the presence of the continuous glass fiber in the surface layer of the panel. When a panel is situated in a mold under compression, the resin material located between the panel surface and a glass fiber in the surface layer of the panel is under higher pressure than the resin material located not adjacent to a glass fiber. As a consequence, when the part is demolded, the cured viscoelastic resin material located adjacent to a glass fiber will expand more than the resin material not adjacent to a glass fiber. This results in a panel with a surface showing protruded contours of various glass fibers which are located immediately below the surface of the panel, commonly known as the glass fiber readout problem. Another cause of fiber readout is the differential thermal shrinkage that exists between the glass fibers and the resin. The coefficient of thermal expansion of polymers is at least one order of magnitude larger than the coefficient of thermal expansion for glass fibers. As a result, when a molded part is removed from the mold and allowed to cool to lower temperatures, the glass rich regions shrink less than the resin rich regions which in turn causes the formation of protuberances over the fibers near the surface.

Another type of glass fiber reinforced polymeric products that suffer from fiber readout is sheet molding compound (SMC) parts molded from charges with high mold coverage, i.e., with minimum flow. The reason for reducing the extent of flow in the mold is to overcome the problem of long term waviness. For that purpose SMC can be compounded with chopped roving or continuous glass fiber mats and the charge will be cut to the size of the cavity such that the paste does not flow considerably. The disadvantage of this method is the formation of fiber readout on the cosmetic surface.

Numerous efforts have been made to correct the glass fiber readout problem. However, none of them were found to work satisfactorily in hiding the glass readout on the surface of a RIM part. For instance, an in-mold coating process used on a conventional RIM part disclosed in U.S. Pat. No. 4,282,285 was found inadequate to correct the problem. This fiber readout problem makes the glass fiber mat reinforced RIM material unsuitable for exterior automobile body panel applications for aesthetic reasons.

I have previously disclosed a method of producing glass fiber mat reinforced plastic panels with smooth surfaces in U.S. Pat. No. 4,610,835. In that method, premolded glass fiber mat reinforced plastic panels are first cooled to room temperature and then coated with a room temperature curable polyurethane composition. A molding pressure is then applied momentarily to spread out the coating material and then released while the coating material is still in its fluid state. Even though the process generally works well in producing glass fiber mat reinforced plastic panels with a smooth surface, it has several processing drawbacks. First, the panels after the molding process must first be cooled to room temperature before the coating material can be applied. This means that storage facilities must be provided such that panels may be stored between the molding and the coating operation. Consequently, the same molding machine can not be used in the coating operation which leads to substantially higher manufacturing cost. Secondly, since only room temperature curable polyurethane composition can be used in that process, longer curing times are required.

It is therefore an object of the present invention to provide a method of producing glass mat reinforced panels with smooth surfaces without the fiber readout problem.

It is another object of the present invention to provide a method of making glass mat reinforced panels for automotive exterior body panel applications having smooth surfaces by coating premolded panels maintained at or near the panel molding temperatures with a polymeric coating material.

It is a further objective of the present invention to provide a method of producing glass mat reinforced panels for automotive exterior body panel applications having smooth and predecorated surfaces that do not require further painting or decorating.

SUMMARY OF THE INVENTION

In accordance with a preferred practice of my invention, a method of producing a smooth surface on a premolded glass fiber mat reinforced polymeric panel where protruding fibers would otherwise produce a rough surface can be carried out by the following operative steps.

First, a substrate panel is molded. A typical method would consist of placing four layers of 1 oz/ft$^2$ density continuous glass fiber mats in the mold cavity, closing the mold, injecting a polyurethane resin and allowing it to cure for one minute at 150° F. In the second step, the mold is opened and a predetermined quantity of a coating material is injected onto the hot surface of the substrate to form a top layer. A pressure is then applied momentarily on the coated surface causing the coating material to fill the valleys between the protruding fibers and to flow evenly to cover the entire surface of the premolded panel. This pressure is subsequently removed when the coating material is still in its fluid state. The coating material is then allowed to cure and harden.

The present invention may be practiced, for example, by placing and positioning a premolded glass fiber mat reinforced polymeric panel into the cavity of the lower mold piece of a matched mold, coating the surface of the premolded panel maintained at 150° F. with a 150° F. curable polyurethane composition, then applying pressure on the coated surface through the upper mold piece of the matched mold to cause the coating to flow and fill the valleys between the protruding fibers. This pressure also makes the coating material to flow evenly to cover the entire surface of the premolded panel. The molding pressure is released while the coating material is still in its fluid state. The coating composition is allowed to flow on a small scale to form a smooth surface and to cure under the dead weight (less than 1 psi) of the upper mold piece.

Optionally, a layer of a predecorated sheet material can first be placed in the upper mold cavity with the decorated side of the sheet facing the mold. The two mold members are then compressed together with a coating material sandwiched between the predecorated sheet and the premolded panel. When the pressure on the partially cured resin is released it expands or flows to fully cover the glass fibers in the surface of the premolded panel and to provide a smooth surface to which the predecorated sheet adheres. A finished panel having a predecorated sheet permanently bonded to it is produced by this process. The finished panel can be readily used as an automotive exterior body panel without further painting or decorating.

DESCRIPTION OF THE DRAWINGS

Other objects, features and advantages of the present invention will become apparent upon consideration of the specification and the appended drawings, in which.

DESCRIPTION OF THE PREFERRED EMBODIMENT

One major obstacle in using glass fiber mat reinforced plastic panels in automobile exterior body panels is the fiber readout problem. The problem is known to be caused by the large differences that exist between the thermal expansion properties of the glass and of the resin.

My invention is a unique technique which allows for the production of glass fiber mat reinforced plastic panels with smooth surfaces. The technique is to make a premolded panel by the conventional method at its molding temperature for rapid production, and then release the molding pressure to apply a polyurethane coating material on the hot panel. A 300 psi pressure is momentarily applied on the coated part and then released. The coating is then left to harden at near zero molding pressure.

Figure 1:
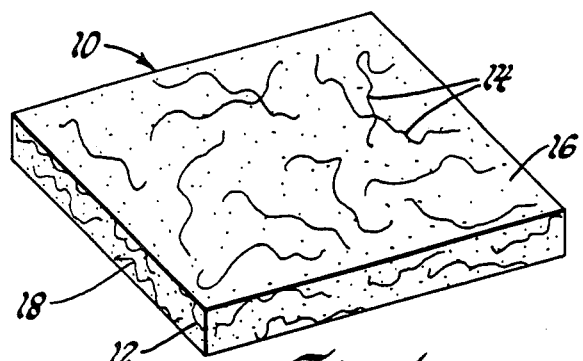
FIG. 1 is a perspective view of a premolded glass fiber mat reinforced polymeric panel showing fiber readout in the surface layer of the panel.
Figure 2:
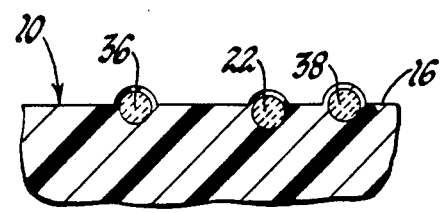
FIG. 2 is a schematic of an enlarged cross-sectional view of the panel in FIG. 1 showing the protruding fibers partially embedded in the surface layer of the polymeric material.

Referring initially to FIG. 1, a glass fiber mat reinforced RIM panel 10 is shown having protruding glass fibers 14 in the surface layer 16 of the polymeric panel. The continuous glass fiber mat 18 is also visible through the thickness 12 of the panel. The technology of making continuous glass fiber mats is well known today and can be found in many technical publications. For instance, it is described in the *Encyclopedia of Polymer Science and Technology,* Vol. 6, page 639. A schematic showing an enlarged cross-sectional view of panel 10 (FIG. 1) is shown in FIG. 2. The protruding fibers 22, 38 and 36 are shown in the surface layer 16 of RIM panel 10.

Figure 3:
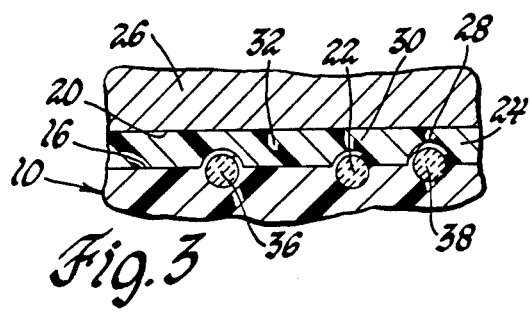
FIG. 3 is a schematic of an enlarged cross-sectional view of the panel in FIG. 1 after the rough surface was coated with a urethane composition and held under a molding pressure of 300 psi.

FIG. 3 shows a premolded panel 10 coated with a layer 24 of polyurethane composition while being pressed under pressure at the mold surface 20 of mold 26. The coating can be applied by either free pour into an open mold or by injection under pressure into a closed mold. The coating material at 28 is under a higher compressive state than the coating material at 30 due to the different position of the protruding fibers. The coating resin material contained at 28 between mold surface 20 and fiber 38 has lesser room to expand than the resin material at 30 contained between mold surface 20 and fiber 22. Similarly, the resin material contained at 30 is under a higher compressive state than the resin material contained at 32. Therefore, when mold pressure applied at mold surface 20 is released, the resin material at 28 and 30 will expand back more than the resin material at 32 because of their respectively higher compressive state.

Figure 4:
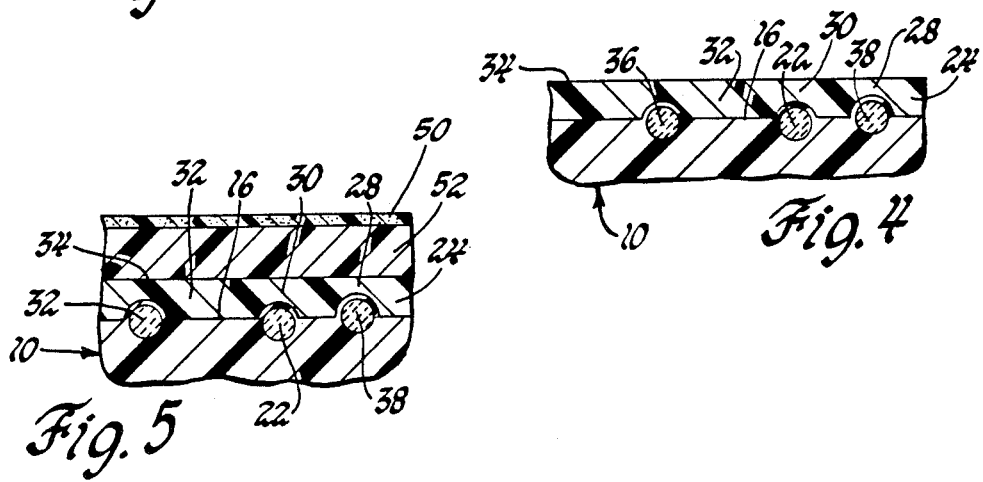
FIG. 4 is a schematic of an enlarged cross-sectional view of the panel in FIG. 1 after coating with a polyurethane composition where the premolded panel was maintained at a temperature of 150° C. prior to and during the coating operation and the molding pressure was released during the cure.

To avoid the fiber readout problem, a novel technique is provided by the present invention. In FIG. 4, a premolded glass fiber mat reinforced polymeric panel is coated with a sufficient thickness of polyurethane composition. The coating material at different locations 28, 30 and 32 (FIG. 4) is in the same compressive state. This is achieved by releasing the molding pressure (300 psi) at mold surface 20 (FIG. 3) when the coating layer 24 is still in its fluid state and allowing the coating resin to flow under near zero pressure forming a smooth surface. The end result is that the top surface 34 of the coating remains smooth after the coating composition is fully cured.

Figure 5:
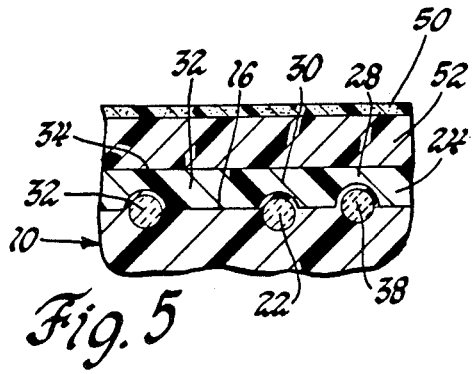
FIG. 5 is a schematic of an enlarged cross-sectional view of a premolded glass fiber reinforced panel having a prepainted sheet laminated thereon by a polyurethane resin layer.

Optionally, a layer of a prepainted sheet material may be placed in the upper mold cavity with the painted side facing the mold before the coating material is compressed between the two molds. The coating material is chosen such that it will permanently bond to both the sheet material and the panel material. A panel having a smooth decorated surface is produced which can be readily installed on a vehicle without further painting or decorating. A schematic of an enlarged cross-sectional view of a premolded glass fiber reinforced panel having a prepainted sheet laminated thereon by a polyurethane resin layer is shown in FIG. 5. A paint layer 50 is first sprayed on a thermoplastic sheet 52 and oven baked and cured. The sheet 52 is then laminated to the premolded panel 10 by the polyurethane layer 24.

Example I

A urethane resin was chosen with the formulation shown in Table I. The chemicals used were obtained from the following sources, NIAX® 11-34 Polyol from Union Carbide Corporation, ISONATE® 181 from Upjohn Corporation, Ethylene Glycol grade AR and FOMREZ® UL - 29, an alkyltin mercaptide from Witco Co.

TABLE I

| Component | Wt % |
|---|---|
| Polyol | 50 |
| Isonate ® | 44 |
| Ethylene Glycol | 6 |
| Fomrez ® UL-29 | 0.1 |

Two plies of a glass mat obtained from Owens-Corning Fiberglas (#M-8605, density of 0.04 g/cm²) are wet with a RIM resin composition shown in Table I. They are then press molded at 67° C. for ten minutes to make a plaque in the dimension of 150×150×3 mm. The surface of the plaque at this stage after being cooled to room temperature shows considerable amount of fiber readout (similar to that illustrated in FIG. 1).

The surface of the molded plaque was then cleaned with isopropanol and placed in a mold maintained at 67° C. A urethane coating material with the formulation shown in Table II is poured over the plaque and then press molded at 67° C. and 300 psi pressure. The 300 psi pressure was applied only for ten seconds and then released. The release of the pressure before the resin cures is a key factor in this process. If the molding pressure is kept at 300 psi, the molded part will still show fiber readout at the end of the process. The reason is that the portion of the coating material directly facing the fibers experiences a higher pressure and remains in a highly compressed state during the molding process. As the pressure is released at the end of the molding cycle, the compressed regions would expand back and show fiber readout on the surface.

TABLE II

| Component | Wt % |
|---|---|
| Polyol | 50 |
| Isonate ® | 44 |
| Ethylene Glycol | 6 |
| Fomrez ® UL-29 | 0.5 |

The novel technique disclosed in the present invention requires the release of the molding pressure just prior to the hardening of the resin. A surface layer of coating material is maintained at a uniform low pressure (e.g., less than 1 psi) by the dead weight of the upper mold piece such that the resin can flow on a small scale and thereby produce a smooth surface. The purpose of applying a high molding pressure at the start of the molding is to ensure that resin flows and fills the valleys between the protruding fibers in the surface.

After the initial molding pressure is released, the part is left in the mold under the dead weight of the mold platen to cure for one minute. The surface of the part after removal from the mold showed no fiber readout. It should be noted that other urethane compositions having a faster cure rate can be used to shorten the total cycle time required. Moreover, other thermoset compositions may also be used in place of polyurethane. An example of such a composition is an epoxy based material.

In addition to concealing the fiber readout, this novel technique also provides a surface that is free from porosity since fibers are kept away from the surface. In the case where the urethane coated surface will be painted in a subsequent operation, the composition of the coating layer can be chosen such that it will chemically match the substrate (the premolded panel) and the paint so that the need for using primer is eliminated.

Example II

In this example, a rigid polyurethane resin was chosen with the formulation shown in Table III as the substrate material. The substrate panels are made according to the same procedures as that depicted in Example I.

The formulation of the coating material used on the panel is the same as that shown in Table II, Example I. A more rigid polyurethane panel with a perfectly smooth surface without the fiber readout problem was obtained.

TABLE III

| Formulation For Rigid Polyurethane Resin | |
|---|---|
| Component | WT % |
| Polyol | 25.0 |
| Isocyanate | 65.0 |
| Ethylene Glycol | 10.0 |

TABLE III-continued

| Formulation For Rigid Polyurethane Resin | |
|---|---|
| Component | WT % |
| Fomrez ® UL-29 | 0.01 |

The polyol I used was a polyether tetrol supplied by the BASF Wyandotte Company under the tradename of Pluracol ® (PEP-550). It has an equivalent weight of 500. The isocyanate I used was a diphenylmethane diisocyanate supplied by the Dow Chemical Company under the designation of Isonate ® 181.

Example III

In this example, a prepainted thermoplastic sheet is laminated to the rough surface of a premolded glass fiber mat reinforced panel by a layer of polyurethane coating material. The polyurethane chemicals used for the panel and the coating material are the same as that used in Example I (Tables I and II). The thermoplastic carrier film in the thickness of 0.01 inch is a modified PET material (PETG 6763) supplied by Eastman Chemical Products. Other suitable plastic sheet or film may also be used.

A premolded glass fiber mat reinforced panel is first prepared by the method described as that described in Example I. The unpainted side of a carrier film was then cleaned with isopropanol and placed in a mold with the painted side facing the mold. A urethane coating material with the formulation shown in Table II was poured over the film. The surface of a premolded panel was also cleaned with isopropanol and placed in the mold with the cleaned surface facing the coating material. The whole system was then press molded at 67° C. A 300 psi pressure was applied for 10 seconds and released. The release of the pressure before the resin hardens is a key factor in this process. If the pressure is kept high, the molded part would still show fiber readout at the end of the process. The reason, as explained before, is that the parts of the material directly facing the fibers experience a much higher pressure and remain considerably compressed during the process. As the pressure is released at the end, the compressed regions would expand back and show fiber readout on the surface. After the pressure was released, the part was left in the mold to cure for one minute. The surface of the part after being removed from the mold showed no fiber readout. This is because the coating layer provides a base for the sheet to fully cover the glass fibers in the surface of the premolded panel and a smooth surface to which the predecorated sheet adheres.

Example IV

In this example a polyester formulation as shown in Table IV was chosen as an SMC (sheet molding compound) material to be reinforced with 25% by weight chopped glass roving.

TABLE IV

| Component | WT, g |
|---|---|
| Polyester resin (RP 325) | 22.4 |
| Low profile additive (RP 775) | 12.3 |
| Polyester resin (RP 500) | 3.2 |
| t-butyl perbenzoate | 0.21 |
| t-butyl peroctoate | 0.21 |
| zinc stearate | 1.61 |
| magnesium oxide | 0.27 |
| calcium carbonate | 59.8 |

The polyester resins I used, RP 325 and RP 500 are supplied by the Owens-Corning Fiberglas Company. The low profile additive I used, RP 775, was a thermoplastic material dissolved in a styrene monomer. It is also supplied by the Owens-Corning Fiberglas Company. I believe any other unsaturated polyester compositions should work equally well in my polyester formulation. After compounding, the SMC sheet was cut to the size of the mold, 9×11 inches, and molded at 150° C. and 1000 psi. The mold was then opened and 150 cc of the coating material was poured over the panel. The mold was then closed to 1000 psi for 10 seconds and was released to the dead weight of the upper platen of the mold. A smooth surface on the SMC panel without any surface imperfection was obtained.

The coating material used was a polyurethane supplied by Akzo Chemie America under the tradename of Trigonox ®. It is a mixture of polyether based and polyester based polyurethanes. I have found that the polyurethane composition disclosed in Table II and another commercially available polyurethane material supplied by Sherwin Williams under the tradename of Polane Glas-Clad ® may also function satisfactorily as the coating material.

Example V

In this example a polyester formulation as shown in Table V was chosen to be reinforced with 25% by weight continuous glass fibers.

After compounding, the SMC sheet was cut to the size of the mold, 9×11 inches, and molded at 150° C. and 1000 psi. The mold was then opened and 150 cc of the coating material was poured over the panel. The mold was then closed to 1000 psi for 10 seconds and was released to the dead weight of the upper platen of the mold. A smooth surface on the continuous glass fiber reinforced polyester panel without any fiber readout defect was obtained.

Example VI

In this example a polyester formulation as shown in Table V was chosen to be reinforced with 25% by weight chopped glass roving.

TABLE V

| Components | WT, g |
|---|---|
| Polyester resin (RP 325) | 22.4 |
| Low profile additive (RP 775) | 12.3 |
| Polyester resin (RP 500) | 3.2 |
| t-butyl perbenzoate | 0.21 |
| t-butyl peroctoate | 0.21 |
| zinc stearate | 1.61 |
| magnesium oxide | 0.27 |
| glass microspheres | 5.0 |

The chopped glass roving fibers I used were type N-523 supplied by the Owens-Corning Fiberglas Company. The average length of the fibers is 2.5 inches. The glass microspheres I used was supplied by the 3M Company (Type B23/500) having a nominal density of 0.23 gm/cm$^3$.

After compounding, the SMC sheet was cut to the size of the mold, 9×11 inches, and molded at 150° C. and 1000 psi. The mold was then opened and 150 cc of the coating material was poured over the panel. The mold was then closed to 1000 psi for 10 seconds and was released to the dead weight of the upper platen of the mold. Again, an SMC panel having a smooth surface without any surface imperfection was obtained.

Example VII

In this example a polyester formulation as shown in Table V was chosen to be reinforced with 25% by weight continuous glass fibers.

After compounding, the SMC sheet was cut to the size of the mold, 9×11 inches, and molded at 150° C. and 1000 psi. The mold was then opened and 150 cc of the coating material was poured over the panel. The mold was then closed to 1000 psi for 10 seconds and was released to the dead weight of the upper platen of the mold. A continuous glass fiber reinforced SMC panel without any glass fiber readout defects in the surface layer was obtained.

While my invention has been described in terms of seven preferred embodiments thereof, it is to be appreciated that those skilled in the art will readily apply these teachings to other possible variations of the invention.

The embodiments of the invention in which an exclusive property or privilege is claimed are defined as follows:

1. A method of producing a smooth surface layer on the surface of a premolded glass fiber mat reinforced panel situated in a matched mold were protruding fibers produce a rough surface, said method comprising:
    positioning said premolded panel in the cavity of the lower mold piece of said matched mold,
    coating the rough surface of said premolded panel with a thermoset polymeric material such that the thickness of said coating is adequate, said premolded panel being maintained at a temperature of no less than 67° C. during said coating operation,
    applying sufficient pressure on said coated surface through an upper mold piece positioned on said panel to cause said coating to fill the valleys between the protruding fibers and to flow evenly to cover the entire surface of said panel, and
    relieving said pressure while said coating is still in its fluid state and allowing said coating composition to sufficiently harden under the dead weight of said upper mold piece, whereby the cured coating provides a smooth surface layer on said panel that masks said protruding fibers.

2. A method of producing a smooth decorative surface by laminating a predecorated carrier film having a first decorated surface and a second undecorated surface to the surface of a premolded glass fiber mat reinforced panel where protruding fibers produce a rough surface, said method when practiced in a matched mold comprising the steps of:
    positioning said predecorated carrier film into the first half of said matched mold with the first decorated surface of the carrier film facing the mold surface;
    applying a layer of a thermoset polymeric resin coating to the second undecorated surface of the carrier film to a thickness adequate to substantially cover all the valleys created between the protruding fibers in the surface layer of said premolded panel in a subsequent operation;
    positioning said premolded panel over the coating resin, said panel being at a temperature of no less than 67° C. during said lamination process;
    applying sufficient pressure on said premolded panel through the second half of the matched mold positioned thereon to cause said coating resin to substantially fill the valleys between the protruding fibers and to flow evenly to cover the entire surface of said panel; and
    relieving said pressure while said coating resin is still in its fluid state and allowing said coating resin to sufficiently harden under the head weight of said second half of the matched mold, whereby said decorated layer is bonded to the rough surface of the premolded panel and said resin layer is evenly distributed between said decorative layer and said rough surface to hide the protruding glass fibers.

* * * * *